United States Patent [19]
Driscoll et al.

[11] 4,113,560
[45] Sep. 12, 1978

[54] CORE CATCHER FOR NUCLEAR REACTOR CORE MELTDOWN CONTAINMENT

[75] Inventors: Michael J. Driscoll, Cambridge, Mass.; Frank L. Bowman, Gales Ferry, Conn.

[73] Assignee: Massachusetts Institute of Technology, Cambridge, Mass.

[21] Appl. No.: 723,403

[22] Filed: Sep. 15, 1976

Related U.S. Application Data

[63] Continuation of Ser. No. 595,639, Jul. 14, 1975, abandoned, which is a continuation of Ser. No. 412,389, Nov. 2, 1973, abandoned.

[51] Int. Cl.² .............................................. G21C 9/00
[52] U.S. Cl. ..................................................... 176/38
[58] Field of Search .............................. 176/38, 37, 87

[56] References Cited

U.S. PATENT DOCUMENTS

| 3,168,445 | 2/1965 | Ziegler et al. | 176/38 |
| 3,378,452 | 4/1968 | Costes | 176/38 |
| 3,607,630 | 9/1971 | West et al. | 176/38 |
| 3,629,064 | 12/1971 | Zivi | 176/38 |
| 3,702,802 | 11/1972 | Jansen, Jr. | 176/38 |
| 3,719,556 | 3/1973 | Snyder, Jr. et al. | 176/38 |

Primary Examiner—Harvey E. Behrend
Attorney, Agent, or Firm—Arthur A. Smith, Jr.; Martin M. Santa

[57] ABSTRACT

A bed of graphite particles is placed beneath a nuclear reactor core outside the pressure vessel but within the containment building to catch the core debris in the event of failure of the emergency core cooling system. Spray cooling of the debris and graphite particles together with draining and flooding of coolant fluid of the graphite bed is provided to prevent debris slump-through to the bottom of the bed.

4 Claims, 2 Drawing Figures

CORE CATCHER FOR NUCLEAR REACTOR CORE MELTDOWN CONTAINMENT

This is a continuation of application Ser. No. 595,639 filed July 14, 1975 (now abandoned) which is a continuation of application Ser. No. 412,389 filed Nov. 2, 1973 (now abandoned).

BACKGROUND

Decay heat generation associated with the accumulated inventory of radioactive fission products provides a potentially self-destructive energy source in nuclear reactor cores, and therefore requires a continuously available cooling capability, even following shutdown from normal operation. In reactors of the light-water-cooled type (LWR), such as the pressurized-water-reactor (PWR) and boiling-water-reactor (BWR), it is at least hypothetically possible that a loss-of-coolant accident (LOCA) could occur together with sumultaneous failure of emergency core cooling systems (ECCS). In this event the core 1, generally consisting of uranium dioxide fuel clad in zirconium alloy tubing, would melt, and in the absence of subsequent intervention could melt through the reactor vessel and then breach the primary system containment, permitting access of the highly radioactive debris to the uncontrolled environment.

PURPOSE OF INVENTION

The device described in this disclosure is a core catcher 2 designed to stop the molten core and structural debris 3 from breaching reactor containment 4 by catching it following melt-through of the reactor pressure vessel 5, quenching it sufficiently to induce at least partial solidification, and holding it in a configuration suitable for initiation of active means for cooling the conglomerate.

DESCRIPTION OF INVENTION

Figures 1, 2:
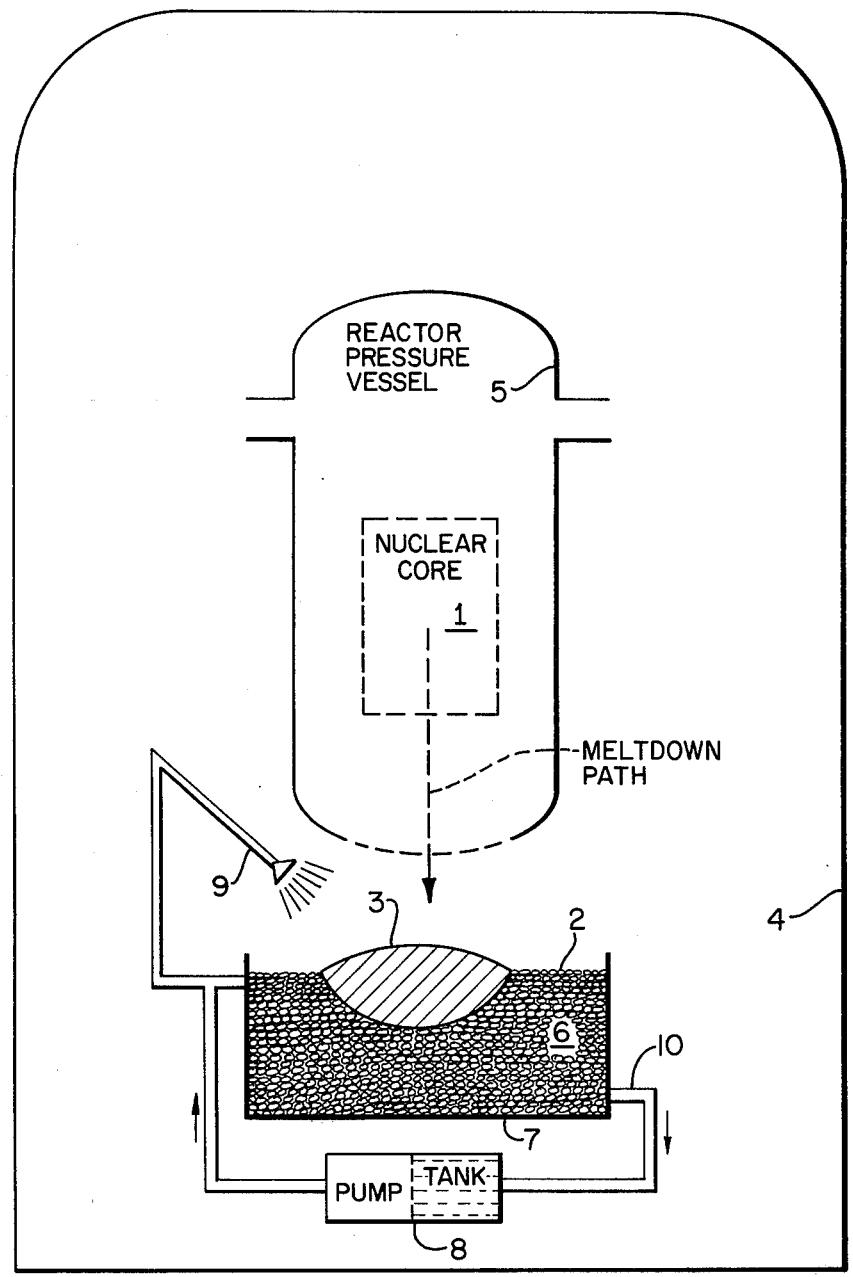
FIG. 1 is a cross-sectional view of a nuclear reactor showing the core catcher of this invention.
FIG. 2 is a view of a few of the stick-like graphite particles of the graphite bed.

The invention is more completely described herein when read in conjunction with the accompanying figure.

The core catcher 2 consists of a bed of graphite particles 6 in a bin 7 placed under the reactor pressure vessel 5, which provides the passive features of the device; plus an active cooling system 8 designed to remove decay heat in the post-intercept phase.

The graphite bed consists of a random array of particles 6. The graphite form of carbon is preferred because of its high thermal conductivity, which is important because of the desirability of quickly quenching and freezing the molten debris upon contact, thereby encasing it in a self-made crucible, which also prevents it from merely pouring through the bed. Graphite also has the desirable properties, for the present application, of high melting point and thermal shock resistance. The particle size is also important: sufficiently large to avoid fluidization or scour by water or steam, but sufficiently small to provide a high surface area for thermal contact with the debris; likewise the interstices should be large enough to facilitate drainage of water and venting of steam but not so large as to substantially enhance overall bed heat conductance through convective cell action, or permit molten debris to channel through the bed. Calculations and experimental simulations using lead indicate that particles having on the order of a one-half inch minor dimension are suitable, but a rather wide range of acceptability is indicated. Particle shape is not a crucial variable: spherical particles are easier to treat theoretically, but stick-like particles 11 would have a greater tendency to lock-up and resist scour.

The bed configuration has a number of advantages over solid-wall crucible designs. First of all it facilitates drainage of water in the pre-intercept phase. This is desirable because dropping molten debris into a pool of water can result in a destructive steam explosion. Conversely, however, the bed provides redundant coolant channel access in the post-intercept phase under conditions in which it would be difficult to insure the integrity of more structured configurations. Particle beds also have the advantage of low overall thermal conductivity relative to a solid of the same composition. This helps protect the bin wall against structural damage due to high temperature.

The bin of graphite particles can by itself passively intercept and delay the molten core and attendant debris. However the decay heat available is sufficient to heat up the bed, gradually remelting the debris, permitting it to slump through the bed, penetrating at a rate of a fraction of a foot per hour, until, without active intervention, it would ultimately breach the bottom of the core catcher bin. Therefore it is necessary to provide sufficient bed depth (several feet) to delay slump-through and protect the bin bottom until active cooling can be initiated.

The cooling system depicted in the figure is one convenient version of a design which takes advantage of the particle bed configuration in a manner which insures high reliability and modest cost. An overhead spray 9 is combined with a bottom flood/drain capability 10 to provide means for getting cooling water to and from the suspended debris. Steam generated in the cooling process is vented to the normal containment cooling system. for example, as described in the book, "Nuclear Power Plant Systems and Equipment", Kenneth Lish, 1972, Industrial Press, Inc. Likewise water for cooling can be drawn from any of a number of available storage tanks, such as those containing make-up water, normally provided as part of other reactor systems. It may be chemically treated with boron or fission-product scavengers, but this is immaterial to its present function.

Then bin used to contain the graphite bed need serve no other purpose than provision of structural support, and it may, for example, be steel or concrete, lined with refractory material or bare, since it is to be protected from thermal damage by low bed conductivity in the passive phase, and by cooling water in the active phase. Likewise total bed lateral dimensions and depth are not rigidly constrained variables, but typical widths of on the order of 30 ft. (larger than the pressure vessel diameter) and depths of 10 feet (to allow several hours delay time for debris penetration prior to the required initiation of active cooling) are envisioned.

Finally, while the system is here described in an application to LWR reactors, there is no inherent restriction against its use with other systems, except that for fast reactors it may be necessary to incorporate neutron poisons such as boron in the graphite to prevent critical reassembly of the highly enriched fuel; and in the case of liquid metal cooled systems their normal coolant, sodium, would be preferable to water for the core catcher coolant as well.

What is claimed is:

1. In a nuclear reactor of the type having a liquid cooled core in a pressure vessel which is in a containment building having an emergency cooling fluid system the combination with a core catcher for the containment of the debris of a nuclear reactor core meltdown comprising, a bed of high thermal conductivity graphite particles placed under said nuclear reactor core pressure vessel, a bin for containing said particles, means for draining said bed of the core cooling fluid upon meltdown of said core into said bin, means for spraying said debris with said cooling fluid from said bin, means for flooding said bin with said cooling fluid, and said bin being large enough to contain said bed, core debris, and core cooling and emergency fluid.

2. The core catcher of claim 1 wherein said graphite particles have a size large enough to avoid fluidization by the cooling fluid, but small enough to provide a high surface area for thermal contact with the core debris; the interstices of said particles are large enough to facilitate drainage of the cooling fluid and venting of its vapor but not so large as to enhance overall bed heat conductance through convective cell action and not so large as to permit molten debris to channel through the bed to the walls of the bin.

3. The core catcher of claim 2 wherein said graphite particles are stick-like in shape.

4. The core catcher of claim 1 wherein the fluid used for cooling the suspended debris is the original core-cooling fluid supplemented by the same type of fluid from the storage means, and said bin is also large enough to contain the additional fluid from said storage means.

* * * * *

UNITED STATES PATENT AND TRADEMARK OFFICE
CERTIFICATE OF CORRECTION

PATENT NO. : 4,113,560

DATED : September 12, 1978

INVENTOR(S) : Michael J. Driscoll; Frank L. Bowman

It is certified that error appears in the above–identified patent and that said Letters Patent are hereby corrected as shown below:

In column 1, after line 8, insert the following paragraph:

-- The invention described herein may be manufactured and used by or for the Government of the United States of America for governmental purposes without the payment of any royalties thereon or therefor. --

Signed and Sealed this

Fifth Day of December 1978

[SEAL]

Attest:

RUTH C. MASON
Attesting Officer

DONALD W. BANNER
Commissioner of Patents and Trademarks